US008548612B2

(12) United States Patent
Rhein

(10) Patent No.: US 8,548,612 B2
(45) Date of Patent: Oct. 1, 2013

(54) METHOD OF GENERATING A FOOTPRINT FOR AN AUDIO SIGNAL

(75) Inventor: Hanspeter Rhein, Wedemark (DE)

(73) Assignee: Unlimited Media GmbH, Wedemark (DE)

( * ) Notice: Subject to any disclaimer, the term of this patent is extended or adjusted under 35 U.S.C. 154(b) by 991 days.

(21) Appl. No.: 11/814,297

(22) PCT Filed: Jan. 16, 2006

(86) PCT No.: PCT/EP2006/000331
§ 371 (c)(1),
(2), (4) Date: Oct. 20, 2008

(87) PCT Pub. No.: WO2006/077062
PCT Pub. Date: Jul. 27, 2006

(65) Prior Publication Data

US 2009/0069909 A1 Mar. 12, 2009

(30) Foreign Application Priority Data

Jan. 21, 2005 (EP) .................................... 05001258

(51) Int. Cl.
*G06F 17/00* (2006.01)

(52) U.S. Cl.
USPC ........................................................ 700/94

(58) Field of Classification Search
USPC .................... 700/94; 704/500–504, 205, 231
See application file for complete search history.

(56) References Cited

U.S. PATENT DOCUMENTS

| | | | | |
|---|---|---|---|---|
| 6,748,395 | B1 * | 6/2004 | Picker et al. | 1/1 |
| 7,313,571 | B1 * | 12/2007 | Platt et al. | 1/1 |
| 7,421,305 | B2 * | 9/2008 | Burges et al. | 700/94 |
| 2002/0082901 | A1 * | 6/2002 | Dunning et al. | 705/10 |
| 2002/0181711 | A1 * | 12/2002 | Logan et al. | 381/1 |
| 2003/0205124 | A1 | 11/2003 | Foote et al. | |
| 2004/0158437 | A1 | 8/2004 | Klefenz et al. | |

OTHER PUBLICATIONS

Pedro Cano and Eloi Batlle, A Review of Algorithms for Audio Fingerprinting, Universitat Pompeu Fabra; Barcelona, Spain—Ton Kalker and Jaap Haitsma, Philips Research Eindhoven, The Netherlands.
Jurgen Herre, Eric Allamanche, Oliver Hellmuth,Robust Matching of Audio Signals Using spectral Flatness Features, Fraunhofer Institute for Integrated Circuts IIS-A, Erlangen, Germany.
Jaap Haitsma and Ton Kalker, Speed-Change Resistant Audio Fingerprinting Using Auto-Correlation, Philips Research Laboratories Eindhoven; The Netherlands.

* cited by examiner

*Primary Examiner* — Andrew C Flanders
(74) *Attorney, Agent, or Firm* — Fraser Clemens Martin & Miller LLC; J. Douglas Miller

(57) ABSTRACT

Method of generating a footprint for a useful signal, wherein the useful signal represents the evolution of a spectrum comprising useful signal frequencies, for example audio frequencies, over time, which allows automatic detection of identical or similar useful signals in a cost-efficient way and where the footprint is robust against modifications of the useful signal not perceptible to human users, wherein at least one data set comprising a part of the useful signal is processed by an analyzer according to a predetermined analyzing instruction, where the analyzer outputs as a result of the processing a footprint data vector depending on and identifying the processed data set.

19 Claims, 4 Drawing Sheets

Fig. 3

Figure 1:
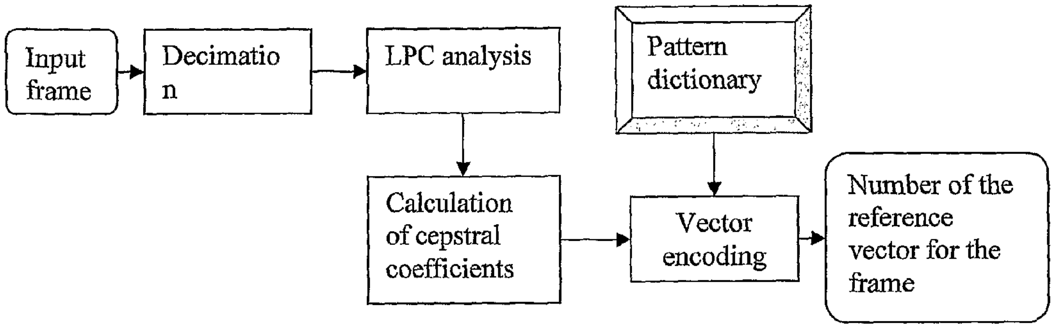

$$\overbrace{\underbrace{D_0, D_1, \ldots, D_{N_v-1}}_{\text{Numbers of vectors from the pattern dictionary}}\ \underbrace{M_0, M_1, \ldots, M_{35}}_{\text{Melody}}\ \underbrace{R_0, R_1, \ldots, R_{19}}_{\text{Rhythm}}\ N_{bpm}}^{\text{Footprint data}}$$

METHOD OF GENERATING A FOOTPRINT FOR AN AUDIO SIGNAL

The invention relates to a method of generating a footprint for a useful signal.

The term 'useful signal' as used herein is meant to designate signals which represent data intended eventually for reception by a user, in particular a human user. Common examples of useful signals are audio signals, representing the evolution of a spectrum of frequencies for acoustic waves over time (the spectrum ranging for example from 300 Hz to 3400 Hz for telephony or from 10 Hz to 20 kHz for high quality reproduction of a classical concert) or video signals (single as well as moving images), where a frequency of the useful signal is, for example for displaying on a TV or cinema screen, defined by the image properties and lies between 0 Hz (an empty image) and a maximum frequency determined by the tows and columns of the screen and a refresh rate for moving images, e.g. 6.5 MHz for many TV-systems.

Useful signals might however also include signals representing text strings or other representations and also future developments of such signals intended directly or indirectly in particular for human perception.

Useful signals might be represented in an analogous way, for example as radio or TV signals, or might be represented as digital signals, for example PCM-signals formed by sampling an analogous signal with subsequent quantizing and perhaps coding steps. In any case a useful signal is meant to include a complete representation of the relevant data set, be it a single piece of music or a set of such tracks, a single image or a complete movie.

There is a general need to compare useful signals with each other, for example for the purpose of distinguishing a particular signal from other signals, or for checking the identity of two useful signals.

The obvious way of checking the identity of two digital signals is bit-by-bit comparison. However, this procedure is not useful in many cases: Suppose a signal has been duplicated by a copy procedure, such that the signals are identical to each other. If the second signal is then modified, e.g., converted to the popular MP3 format for download purposes, after uncompression a comparison of both signals will result in both signals being different. The same holds for digital-to-analog- and analog-to-digital-conversions.

Furthermore, to the best of the applicant's knowledge, there is no method known to automatically identify useful signals, which are not identical, but only similar to each other, where similarity is to be understood from a human perspective. For example, no technical methods are known to identify music tracks which are similar to each other in melody of rhythm.

Typically, to allow for an automatic processing of useful signals, identification data have to be provided along with the signal. As an example, data fields for strings representing authorship, date of recording, type of music, etc. might be added to a music track. For the purpose of determining identical or similar signals, these additional data fields have to be processed. Still, it is difficult to identify similar signals, for example classic and rock music tracks with similar melody.

Data identifying a useful signal in one or more aspects are called a footprint hereinafter (sometimes such data are also called fingerprint). In particular, footprint data might identify a signal with respect to human perception during reception of the signal by a human user.

It is an object of the invention to provide a method of generating a footprint for a useful signal, in particular an audio signal, which allows automatic detection of identical or similar useful signals in a cost-efficient way, where the footprint is robust against modifications of the useful signal not perceptible to human users, and which allows an efficient detection of identical or similar footprints, and to provide respective devices.

This object is solved by a method with the features of claim 1 and a device with the features of claim 18.

According to the invention, at least one data set comprising a part of a useful signal is processed by an analyzer according to a predetermined analyzing instruction, where the analyzer outputs as a result of the processing a footprint data vector depending on and identifying the processed data set.

One of the fundamental ideas of the invention is to generate a footprint as a result of processing the useful signal or a part of it by a useful signal analyzing instruction. Thus, the footprint comprises a footprint data vector represents properties of the useful signal itself. It is not required that a human administrator manually adds descriptional data to the useful signal. As the footprint is related to the properties of the useful signal, identical and similar useful signals can be identified by an appropriate comparison of the respective footprints.

In detail, according to the invention, a method of generating a footprint for a useful signal, in particular an audio signal, wherein the useful signal represents the evolution of a spectrum comprising useful signal frequencies, for example audio frequencies, over time, comprises that at least one data set comprising a part of the useful signal is processed by an analyzer according to a predetermined analyzing instruction, where the analyzer outputs as a result of the processing a footprint data vector depending on and identifying the processed data set.

In preferred embodiments of the inventive method, the analyzing instruction processes the data set with regard to properties of the data set, which are perceptible for human sense during reception of the useful signal by humans. Thus, an identification of useful signals, which appear similar to human perception, is advantageously possible.

In further preferred embodiments of the inventive method, the data set is processed by two or more analyzers and/or two or more analyzing instructions and the footprint data vector represents results of the processing by the analyzers and/or analyzing instructions. Thus, two or more properties of the useful signals might be represented within the footprint, e.g. melody and rhythm.

In other embodiments of the invention, two or more overlapping or non-overlapping data sets of the useful signal are processed and the footprint data vector represents results of the processing of the data sets. Thus, the possibilities of representing signal properties in footprint data vector are greatly enhanced.

In further embodiments of the inventive method, the data set comprises a useful signal frame of the useful signal, the analyzing instruction comprises comparing the data set with each pattern frame of a predetermined pattern dictionary, where the pattern dictionary comprises a numbered list of pattern frames, and comprises estimating a similarity of the useful signal frame with each of the pattern frames, and the analyzer outputs as the result of the processing of the data set the number of the pattern frame which is determined to have highest similarity with the useful signal frame. Advantageously, it is possible to map patterns occurring in the useful signal, which, e.g., might be typical for the particular kind of signal, to known patterns and to replace the pattern by the pattern number. Thus it is possible to characterize with a small data set (a set of pattern numbers) the much larger data set of the useful signal.

In a further developed embodiment, the useful signal frame is assigned a useful signal frame vector, each of the pattern frames is assigned a pattern frame vector, and the similarity of each pair of useful signal frame and pattern frame is determined by calculating the distance between the useful signal frame vector and the respective pattern frame vector. Thus, efficient algorithms known from vector analysis can be advantageously deployed.

In a still further developed embodiment, the analyzer is a spectral analyzer, which calculates smoothed spectrum parameters, in particular cepstral coefficients, for the frame using a linear prediction algorithm. Further, the cepstral coefficients might be encoded using the pattern dictionary and a matrix of distances between reference vectors of the pattern dictionary. Here it is advantageously possible to analyze tone related properties of the useful signal (for music tracks, for example) and represent the analysis results in the footprint.

In other preferred embodiments of the inventive method, the analyzer comprises frequency filters for processing of a frequency spectrum of each of the data sets, where each of the frequency filters is adapted to filter a particular tone from the frequency spectrum of the data sets, resulting in a set of tones, and the analyzing instruction comprises calculating the amplitude of each of the tones of each of the data sets. Thus, rhythm and melody or further tone-related properties can easily be analyzed.

In further embodiments of the inventive method, the analyzing instructions further comprise instructions of calculating a frequency of occurrence of different tones, in particular for determining a melody of the useful signal, and/or a duration of one or more tones, in particular for determining a rhythm and/or a bpm-value representing the beats per minute for the useful signal.

In still further embodiments of the inventive method, the analyzer comprises a signal decimator for downsampling the useful signal, wherein the frequency band containing at least 90% of the energy of the useful signal is kept. This decreases the hardware requirements of the rest of the system.

In another embodiment of the invention, the analyzer comprises an active frame detector for processing the useful signal such that data sets with energy below a predetermined threshold are excluded from further processing, for which the threshold value is obtained by multiplying the average signal energy by a user-defined weighting factor. This procedure prevents false alarms caused by noise.

According to the invention, a method of identifying useful signals of a predetermined set of useful signals which are identical or similar to an input useful signal, wherein each of the useful signals is assigned a footprint generated according to a method of any one of the preceding claims, comprises an identifier unit, which

- receives as an input the footprint data vector of the input useful signal,
- calculates, for each pair of the input useful signal and of one of the set of useful signals, a distance according to a predetermined distance instruction between the respective footprint data vectors,
- returns, as a result of the identification, a list of useful signals whose distance is less than a predetermined threshold value.

This allows for a fast and reliable identification of identical or similar signals.

In a preferred embodiment of the aforementioned method, the step of calculating the distance comprises the following substeps:

- in a first substep, subvectors of the useful signals are used in distance calculation to calculate a raw distance, and the useful signals with raw distances below a first threshold value are provisionally identified,
- in a second substep, the distances of the provisionally identified useful signals to the input useful signal are calculated using the complete useful data vectors.

In case of a large number of signals in the set of useful signals, this allows fast identification of similar useful signals.

The aforementioned methods may be implemented on a computer program, which is adapted to run on a programmable computer, a programmable computer network or further programmable equipment. This allows cheap, easy and fast development of implementations of the inventive methods. In particular, such computer program might be stored on a computer-readable medium, as for example, CD-ROM or DVD-ROM.

Devices for use with the inventive methods may comprise in particular programmable computers, programmable computer networks or further programmable equipment, on which computer programs are installed, which implement the invention.

Figure 2:
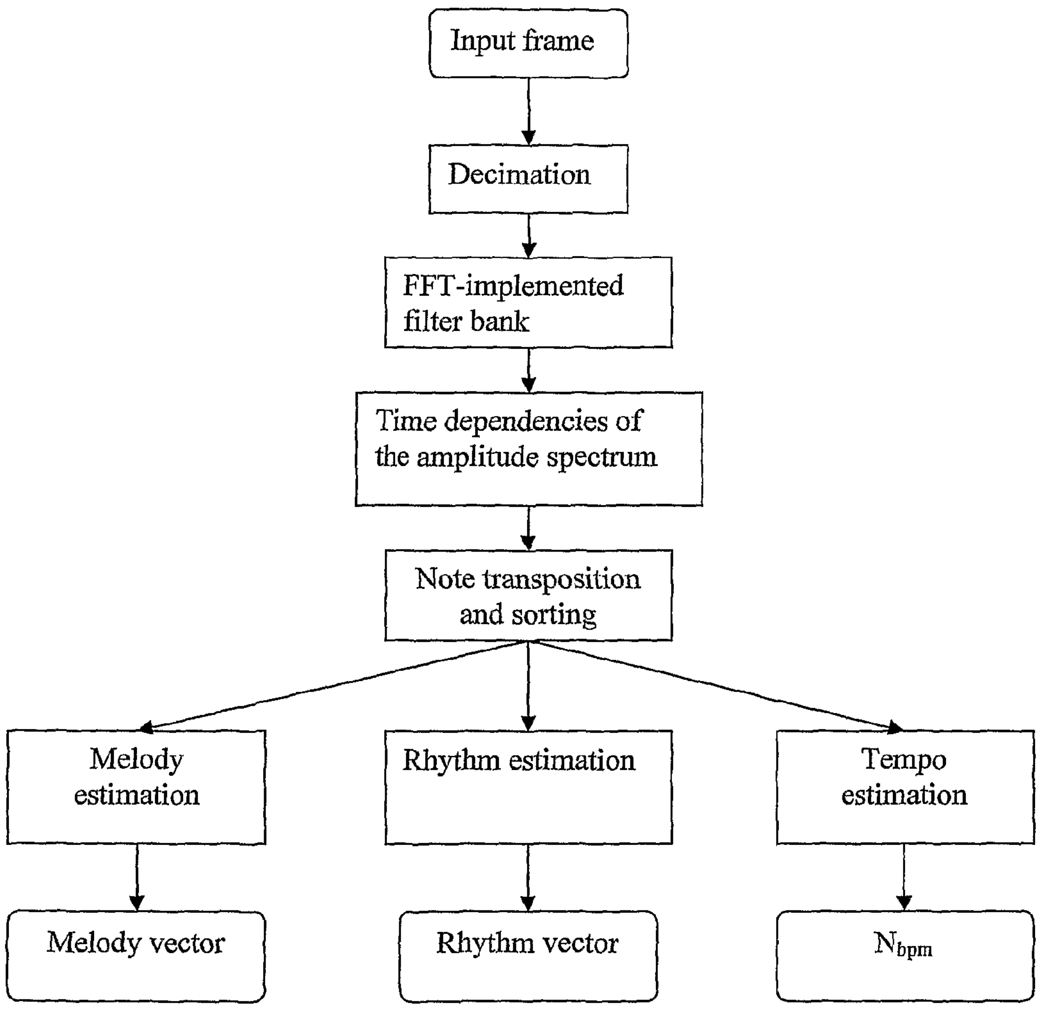
Figure 4:
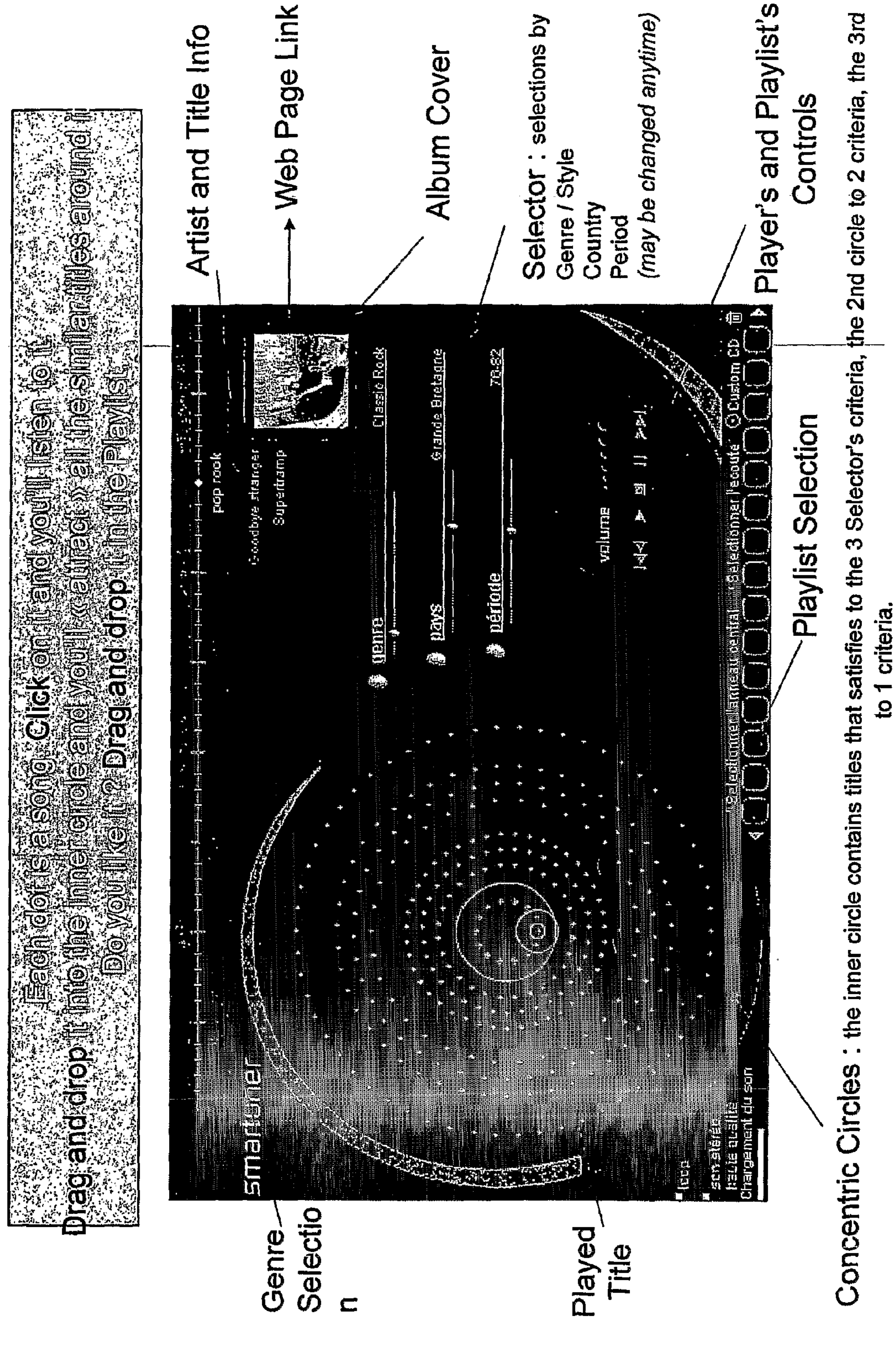

Further aspects and advantages of the invention will become apparent from the following description of embodiments of the invention with respect to the appended drawings, showing:

FIG. 1 a schematic representation of a first embodiment of the invention;

FIG. 2 a schematic representation of a second embodiment of the invention;

FIG. 3 a schematic representation of a footprint data vector according to the invention;

FIG. 4 a screen shot of an application implementing the invention.

The present invention proposes two independent analyzers.

The first analyzer performs vector encoding using a pattern dictionary (FIG. 1). For each frame of the analyzed sequence an N-dimensional input vector consisting of N=12 cepstral coefficients is calculated using a linear prediction algorithm (LCP).

A representative set of musical tracks has been processed to build the pattern dictionary. For this set of useful signals a set of input vectors has been generated. A pattern dictionary has been constructed out of this set of vectors using the Centroid Computation for Codebook Design [L. Rabiner, B. Juang, Fundamentals of Speech Recognition, AT&T, 1993]. An acceptable size of the pattern dictionary (8192 reference vectors) has been determined experimentally.

The current input vector is then replaced by a reference vector, which is the closest to the input vector in a selected metric. Thus, each frame of the useful signal is encoded into one number of a reference vector. Therefore, the whole fragment is encoded as a sequence of $T_{an}/T_{frame}$ numbers of reference vectors from the pattern dictionary.

This algorithm provides efficient encoding of musical files with compression coefficient exceeding 17,500. In a computer-implemented system a user can set the abovementioned parameters according to the properties of the useful signal being processed. Footprints based on the D-codes (Dictionary-codes) are applicable to a wide range of useful signals (audio, video, medicine, etc.).

In preferred embodiments of the invention for use with audio signals, the useful signal is analyzed in separate fragments, each of $T_{an}$=60 sec length. For each fragment, a separate footprint code is generated. The neighboring fragments are chosen to overlap by ½ $T_{an}$.

Preferably, the signal is downsampled with frequency 8000 Hz, which essentially cuts its frequencies at 4000 Hz. The signal interval to be analyzed is split into sequential frames of $T_{fr}$=0.2 seconds each. In a computer-implemented system the user is able to tune these parameters according to the properties of the processed signal.

The second analyzer is based on an FFT implementation of a non-uniform filter bank (FIG. 2). A filter bank with center frequencies corresponding to tones is implemented using the FFT algorithm with dimension $N_{fft}$=65,536.

The central frequencies of the filters $F_k$ should correspond to the note (tone) frequencies:

$$F_k = F_0\left(\sqrt[12]{2}\right)^k,\ k = 1, \dots, 95,\ F_0 = 32.073\text{ Hz}$$

The time dependencies of amplitudes at the output of the filters, calculated for every frame, are used for estimating the melody and rhythm for the useful signal frame being processed. In the preferred embodiment which is discussed here, the estimation algorithm is implemented in the following steps:

1) All notes (tones) are transposed into a single octave, where they obtain the numbers i=0, 1, . . . 11, while keeping the maximal amplitude A[i] of the source note.

2) Note numbers n[i] are sorted in the amplitude decreasing order:

$$A[n[0]]>A[n[1]]> \dots >A[n[11]]$$

3) Three note sequences are formed from the K frames of the fragment:

$$\{n[0,k]\}, \{n[1,k]\}, \{n[2,k]\},\text{ where } k=0,1, \dots, K-1.$$

4) The frequency of occurrence of the first three notes Pn[0,i], Pn[1,i], Pn[2,i], i=0, 1, . . . , 11 is calculated, and a 36-dimensional vector for the fragment being processed is calculated. This vector is essentially the melody estimation (the M-code).

5) The components of this 36-dimensional vector are recorded as the melody estimation for the fragment being processed.

6) A sequence of note duration values is calculated for the sequence n[0,k].

7) A 12-dimensional vector, consisting of the frequencies of occurrence of duration values ranging from 0.2 to 4.0 seconds, is calculated.

8) A weighted average interval is calculated, and a 20-dimensional rhythm vector is calculated.

9) A number of beats per minute (bpm) is estimated for the fragment (this is essentially the tempo value), which is recorded together with the components of the 20-dimensional rhythm vector.

In an embodiment of the invention comprising both analyzers, the following steps are performed:

1) The useful signal is first processed by a signal decimator, which downsamples the useful signal, but keeps the frequency band containing at least 90% of the energy of the source useful signal. This decreases the hardware requirements of the test of the system.

A filter with variable number of frequency-dependent sections and variable sample rate might be used for decimation of the useful signal; this allows the user to keep the most important properties of the useful signal for calculating the footprint data after decimation.

2) After decimation, the downsampled useful signal is processed by an active frame detector, which excludes the frames with energy below an established threshold from further processing, for which the threshold value is obtained by multiplying the average signal energy by a user-defined weighting factor. This procedure prevents false alarms caused by noise.

In the embodiment described here, all frames of the current fragment with energy below a certain threshold are excluded from further processing according to the following steps:

a) the threshold $Th_N$ is calculated according to the following formulae:

$$Th_S = \frac{1}{N}\sum_{i=0}^{N-1} P_i,\ \text{where } P_i = \sqrt{\frac{1}{n_0}\sum_{k=0}^{n_0-1} x_{k+i\cdot Sh}^2}$$

$$Th_N = \gamma_N\left(Th_S + \frac{1}{N_V}\sum_{P_i>Th_S} P_i\right)$$

Here $N_V$ is the number of frames with $P_i$>$Th_S$, $n_0$ is the frame length, N is the number of frames in the fragment, Sh is the overlap length, $\gamma_N$ is a user-defined weight factor;

b) for each frame i its characteristic $S_i$ is calculated:

$$S_i = \begin{cases} 1, & P_i > Th_N \\ 0 & \text{otherwise} \end{cases}$$

The i-th frame is passed to the following stages of analysis if $$S_{i-1}+S_i+S_{i+1}>1.$$

Otherwise it is excluded from further processing.

3) The remaining frames are processed by a spectral analyzer, which calculates the smoothed spectrum parameters (cepstral coefficients) for each frame using linear prediction algorithm.

As described here, Pattern-Comparison Techniques and Spectral-Distortion Measures for Cepstral Distances. A pattern dictionary and a matrix of distances between reference vectors of the pattern dictionary are obtained beforehand, by processing a number of useful signals [L. Rabiner, B. Juang, Fundamentals of Speech Recognition, AT&T, 1993].

The number of reference vectors in the pattern dictionary depends on the class of useful signals. The preferred values are 1024-2048 for speech and 4096-8192 for music. If the inventive footprint technology is applied for signals with different properties, a separate pattern dictionary should be formed for each class of signals, together with a corresponding matrix of distances between the reference vectors.

The number of the reference vector from the pattern dictionary, corresponding to the current frame (i.e. the D-code of the frame), is obtained by the following steps:

a) LPC analysis b) calculation of N cepstral coefficients c) vector encoding using the pattern dictionary 4) The N cepstral coefficients for the current frame are effectively encoded using a precalculated pattern dictionary and a matrix of distances between the reference vectors of the pattern dictionary. The obtained D-code of the current frame is a single number of a reference vector from the pattern dictionary. This algorithm provides a high degree of compression and high decoding efficiency. A D-code of the whole fragment is a sequence of numbers of the reference vectors from a pattern dictionary.

5) Analysis and encoding of distinctive features of the useful signal are performed using an FFT implementation of a non-uniform filter bank. FFT size and limiting frequencies of the filter bank are defined by the user according to the class of the useful signal. For audio signals we propose the value $N_{fft}$=65,536, and limiting frequencies are chosen so to include the tones ranging from 32 Hz to 3,950 Hz.

Analysis of the frequency of occurrence of different notes gives the corresponding melody code (M-code) for the current fragment of the useful signal. Analysis of the duration of each note gives the R-code and the beats per minute ($N_{bpm}$) value for the current fragment.

For estimation of distinctive properties of the useful signal, their encoding and adding to the footprint data, an FFT implementation of a non-uniform filter bank is used, wherein, for music, the non-uniform filter bank is chosen so that the central frequencies of the filters $F_k$ should correspond to the note frequencies:

$$F_k = F_0\left(\sqrt[12]{2}\right)^k, k = 1, \ldots , 95, F_0 = 32.073 \text{ Hz}$$

The M-code, R-code and $N_{bpm}$ for the current fragment are calculated in the following steps:

a) FFT filter bank b) time dependencies of the spectral amplitudes c) transposition of all notes to a single octave (notes obtain the numbers from 0 to 11) and sorting of the notes in the order of decreasing amplitude d) melody estimation (M-code)

e) rhythm estimation (R-code)

f) tempo estimation ($N_{bpm}$)

A relatively large size of the FFT allows to tune the filter bank to the signal properties only by changing the FFT coefficient numbers, which determine the border frequencies of the filters.

The structure of the footprint data resulting from a combination of the output data of the analyzer of FIG. 1 and that of FIG. 2 is shown on FIG. 3. The footprint data consists of a set of pattern numbers from a pattern dictionary, a 36-dimensional vector, a 20-dimensional vector, and a number. Of course, in other embodiments, only one analyzer might be used. The resulting footprints have correspondingly less elements.

The results of the analysis of many useful signals according to previous description may be stored in a database. Each useful signal might be assigned unique footprint data, which are recorded in the database. The footprints corresponding to the same signal are ordered according to the order of fragments in the signal. Thus, a signal can be identified not only as a whole, but also by any of its fragments.

The purpose of the database depends on the purpose of the whole system, in which the footprint technology is used. For musical signals the footprint data has the following structure:

$$\text{footprint data}=(D\text{-code},M\text{-code},R\text{-code},N_{bpm})$$

The size of this data for a single fragment is approximately 2 K.

A preferred embodiment of the method of searching for a similar footprint code according to the invention comprises the following features:

A database of the footprint data for a large number of tracks is stored on a server. This database also contains the attributes of the musical track (name, author, genre, etc.). The server should also possess the means to communicate with a user, who might want to identify a musical track or a part of it by sending the footprint data, generated from it, to the server. In response, the user obtains a report containing titles and other properties of the musical tracks sorted in the order of their relevance.

The necessity of such a list results from the possible existence of many recordings of the same music under different conditions and with different performance, which should all be returned. The list is updated in teal time while the user listens to his track. Since the number of tracks in the database can reach hundreds of thousands, it is important to implement a quick search method.

The embodiment discussed here thus comprises a two-step search system:

We shall designate the footprint code of the current fragment as $\{D_i, M_i, R_i, N_{bpm}\}$, and a footprint code from the database as $\{\tilde{D}_i, \tilde{M}_i, \tilde{R}_i, \tilde{N}_{bpm}\}$.

In the first step of the search algorithm, the footprint codes from the database are searched only by the $R_i$ values and the $N_{bpm}$ value, according to the following rule:

$$\sum_{i=0}^{19} \left|R_i - \tilde{R}_i\right| < \Delta_R(N_{cnd}), \left|N_{bpm} - \tilde{N}_{bpm}\right| < \Delta_{bpm}(N_{cnd})$$

Here $N_{cnd}$ is the desired value of temporary candidates, and $\Delta_{bpm}$, $\Delta_R$ are the tunable thresholds, which depend on $N_{cnd}$.

On the second step of the search algorithm, the temporary candidates are sorted in the order of decreasing weighted error:

$$\varepsilon = w_1\varepsilon_D + w_2\varepsilon_M + w_3\varepsilon_R,$$

where $$\varepsilon_M = \sum_{i=0}^{35} \left|M_i - \tilde{M}_i\right|, \varepsilon_R = \sum_{i=0}^{19} \left|R_i - \tilde{R}_i\right|$$

The error value $\epsilon_D$ is calculated using a dynamic programming algorithm called Dynamic Time Wrapping (DTW). The search speed is significantly increased by precalculation of a matrix of distances between the reference vectors of the pattern dictionary. Thus, the $\epsilon_D$ values are obtained by summation of the matrix elements corresponding to the current values $D_i$ and $\tilde{D}_1$.

The user receives a list of database records together with likeness values calculated using formula:

$$L_n=(1-\epsilon)S_n,$$

where n is the number of the record in the list, and $S_n$ is a monotonously decreasing sequence.

The computer-implemented system allows to tune all abovementioned parameters according to the properties of the useful signal.

A method of searching for similar footprints in a database thus comprises the following steps:

1) The footprint data is generated for the current fragment of the useful signal.

2) K candidates are selected from the database of footprint codes, using quick search by one or several footprint codes from the whole footprint data.

3) The selected K candidates are sorted in order of decreasing values of the objective function, taking into account all footprint codes of the generated footprint data.

Selection of K candidates provides fast searching in a large database even with hundreds of thousands of footprints. The objective function provides the necessary compromise between true and false identification of useful signals.

Applied to musical signals, a current fragment might be identified by the following steps:

1) The fragment is processed, and its footprint data, containing D-code, M-code, R-code and $N_{bpm}$ is generated.

2) A quick selection of K candidate fragments from the database is performed, for which $$\sum_{i=0}^{I_R-1} |R_i - \tilde{R}_i| < \Delta_R(K)$$

$$|N_{bpm} - \tilde{N}_{bpm}| < \Delta_{bpm}(K)$$

where $I_R$ is the dimensionality of the corresponding R-code vector, $\tilde{R}$, $\tilde{N}_{bpm}$, are the footprint codes of the candidate fragment from the database, and the thresholds $\Delta_R$, $\Delta_{bpm}$ depend on the desirable number of candidates K.

3) Sorting of the selected K candidates in the order of decreasing error:

$$\varepsilon = w_1\varepsilon_D + w_2\varepsilon_M + w_3\varepsilon_R,$$

where $$\varepsilon_M = \sum_{i=0}^{I_M-1} |M_i - \tilde{M}_i|,\ \varepsilon_R = \sum_{i=0}^{I_R-1} |R_i - \tilde{R}_i|$$

Here $I_M$ is the dimensionality of the M-code vector.

The error $\epsilon_D$ is calculated using the Dynamic Time Wrapping (DTW) algorithm, taking into account the precalculated distances between the reference vectors of the pattern dictionary.

4) Likeness value (L) estimation for all K candidates from the database:

$$L=(1-\epsilon)S\%$$

where S is the function determining the likeness scale from 0% to 100%.

In preferred embodiments of the invention, the footprint generation and the footprint searching methods may be implemented in software, hardware or both. Each method or parts thereof may be described with the aid of appropriate programming languages in the form of computer-readable instructions, such as program or program modules. These computer programs may be installed on and executed by one or more computers of such like programmable devices. The programs may be stored on removable media (CD-ROMs, DVD-ROMs, etc.) or other storage devices, for storage and distribution purposes or may be distributed via the Internet.

Devices implementing the inventive footprint generation and searching method may be audio player tools for use on a PC. These players might be dedicated hardware with appropriate software, i.e. stand-alone-player, or may be activated on a desktop display of a PC, integrated in a web page or downloaded and installed as a plug-in to execute in known players.

As an example, FIG. 4 illustrates a desktop view of an application having the inventive footprint generation and searching method implemented. Upon request of a user, performed by clicking on one of the light dots in the left part of the view, the player starts playing the requested track. Similar tracks (i.e., tracks within the database serving the application with similar footprints) are displayed nearby to each other. Thus it is easily possible for the user to choose tracks with comparable properties. Which properties are used for comparison, can be also chosen by the user.

Some appropriate embodiments of the invention have been described herein. Many further embodiments are possible, and are evident to the skilled person, without departing from the scope of the invention, which is exclusively defined by the appended claims.

The invention claimed is:

1. A method of generating a footprint for an input useful signal, wherein the input useful signal represents a spectrum of useful signal frequencies over time, comprising the steps of:

processing at least one data set representing a part of the input useful signal with an analyzer according to a predetermined analyzing instruction to generate a useful signal vector;

providing a pattern directory of a plurality of pattern vectors each having a unique associated pattern number not being a vector;

comparing the useful signal vector with each of the pattern vectors in the pattern directory;

determining the associated pattern number of a one of the pattern vectors having a highest similarity with the useful signal vector; and generating a footprint of the input useful signal with the determined pattern number as at least a portion of the footprint of the input useful signal.

2. The method of claim 1 wherein the analyzing instruction controls the processing of the at least one data set with regard to properties of the at least one data set which are perceptible for human sense during reception of the input useful signal by humans.

3. The method of claim 1 wherein the at least one data set is further processed according to at least another analyzing instruction by the analyzer or another analyzer to generate the footprint.

4. The method of claim 1 including processing at least another data set representing an overlapping or non-overlapping part of the input useful signal and generating the footprint from the at least two data sets.

5. The method of claim 1 wherein the at least one data set is a useful signal frame of the input useful signal, the useful signal vector is a useful signal frame vector, the pattern vectors are pattern frame vectors representing pattern frames, the analyzing instruction controls comparing the useful signal frame vector with each of the pattern frame vectors, and the analyzer outputs as a result of the processing of the useful signal frame the number of the pattern frame which is determined to have the highest similarity with the useful signal frame as the portion of the footprint.

6. The method of claim 5 including determining the similarity by calculating a distance between the useful signal frame vector and each of the pattern frame vectors.

7. The method of claim 5 wherein the analyzer is a spectral analyzer that calculates smoothed spectrum parameters including cepstral coefficients for the useful signal frame using a linear prediction algorithm.

8. The method of claim 7 including encoding the cepstral coefficients using the pattern dictionary and a matrix of distances between reference vectors of the pattern dictionary.

9. The method of claim 1 wherein the analyzer includes frequency filters for processing a frequency spectrum of the at least one data set, wherein each of the frequency filters is adapted to filter a particular tone from the frequency spectrum of the at least one data set to obtain a set of tones, the analyzing instruction controlling calculating an amplitude of each of the tones in the set of tones, generating a tone value based upon the amplitudes, and including the tone value in the footprint.

10. The method of claim 9 wherein the analyzing instruction further controls calculating a frequency of occurrence of the tones and, based upon the frequency of occurrence, determining at least one of a melody vector of the input useful signal, a rhythm vector of the input useful signal and a beats per minute number of the input useful signal, and including the at least one of the melody vector, the rhythm vector and the beats per minute number as the tone value in the footprint.

11. The method of claim 1 including identifying useful signals of a predetermined set of useful signals which are identical or similar to the input useful signal, wherein each of the predetermined useful signals is assigned a footprint generated according to the method of claim 1, and wherein an identifier unit receives as an input the footprint of the input useful signal, calculates, for each pair of the input useful signal and one of the set of useful signals, a distance according to a predetermined distance instruction between the respective signal vectors, and returns, as a result of the identification, a list of the predetermined useful signals whose distance is less than a predetermined threshold value.

12. The method of claim 11 wherein the step of calculating the distance includes the substeps of:

calculating a raw distance utilizing subvectors of the predetermined useful signals;

provisionally identifying ones of the predetermined useful signals with raw distances below a first threshold value; and calculating the distances of the provisionally identified predetermined useful signals to the input useful signal using the signal vectors.

13. A non-transitory computer readable medium storing a computer program implementing the method according to claim 11 and adapted to run on a programmable computer, a programmable computer network or further programmable equipment.

14. A non-transitory computer readable medium storing a computer program according to claim 1 and adapted to run on a programmable computer, a programmable computer network or further programmable equipment.

15. A device for implementing the method according to claim 1 including a programmable computer, a programmable computer network or further programmable equipment in which a computer program for performing the method is installed.

16. A device for implementing the method of according to claim 11 including a programmable computer, a programmable computer network or further programmable equipment in which a computer program for performing the method is installed.

17. A system including the device according to claim 16 and a database connected to the device for storing the footprints, wherein the device is adapted to access the database.

18. A method of generating a footprint for an input useful signal, wherein the input useful signal represents a spectrum of useful signal frequencies over time, comprising the steps of:

processing at least one data set representing a part of the input useful signal with an analyzer according to a predetermined analyzing instruction to generate a useful signal vector;

providing a pattern directory of a plurality of pattern vectors each having a unique associated pattern number not being a vector;

comparing the useful signal vector with each of the pattern vectors in the pattern directory;

determining the associated pattern number of a one of the pattern vectors having a highest similarity with the useful signal vector; and generating a footprint of the input useful signal with the determined pattern number as at least a portion of the footprint of the input useful signal wherein the analyzer includes a signal decimator for downsampling the input useful signal, wherein a frequency band containing at least 90% of energy of the input useful signal is maintained.

19. A method of generating a footprint for an input useful signal, wherein the input useful signal represents a spectrum of useful signal frequencies over time, comprising the steps of:

processing at least one data set representing a part of the input useful signal with an analyzer according to a predetermined analyzing instruction to generate a useful signal vector;

providing a pattern directory of a plurality of pattern vectors each having a unique associated pattern number not being a vector;

comparing the useful signal vector with each of the pattern vectors in the pattern directory;

determining the associated pattern number of a one of the pattern vectors having a highest similarity with the useful signal vector; and generating a footprint of the useful input signal with the determined pattern number as at least a portion of the footprint of the input useful signal wherein the analyzer includes an active frame detector for processing the input useful signal such that a data set with energy below a predetermined threshold is excluded from further processing by the analyzer.

* * * * *